(12) United States Patent
Bertrand et al.

(10) Patent No.: US 11,474,625 B1
(45) Date of Patent: Oct. 18, 2022

(54) PRESSURE GESTURE

(71) Applicant: Cirque Corporation, Sandy, UT (US)

(72) Inventors: Jon Bertrand, Taylorsville, UT (US);
David Taylor, West Jordan, UT (US);
Ethan Sturm, Salt Lake City, UT (US);
Michael Litster, Kaysville, UT (US);
Tyler Smith, American Fork, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 17/588,995

(22) Filed: Jan. 31, 2022

(51) Int. Cl.
*G06F 3/0354* (2013.01)
*G06F 3/044* (2006.01)

(52) U.S. Cl.
CPC ........ *G06F 3/03547* (2013.01); *G06F 3/0446* (2019.05); *G06F 2203/04105* (2013.01)

(58) Field of Classification Search
CPC ............... G06F 3/03547; G06F 3/0446; G06F 2203/04105
See application file for complete search history.

(56) References Cited

U.S. PATENT DOCUMENTS

| | | | |
|---|---|---|---|
| 5,889,236 | A | 3/1999 | Gillespie |
| 9,619,044 | B2 | 4/2017 | Tenuta |
| 10,156,921 | B1 | 12/2018 | Smith |
| 10,296,091 | B2 | 5/2019 | Heubel |
| 10,591,992 | B2 | 3/2020 | Feng |
| 2010/0044121 | A1 | 2/2010 | Simon |
| 2014/0368455 | A1 | 12/2014 | Croisonnier |

*Primary Examiner* — Michael Pervan

(57) ABSTRACT

A device may include a pressure sensor; a user interface including an input surface opposite to an underside of the user interface, where the underside is positioned near the pressure sensor; a controller; memory in communication with the controller and comprising programmed instructions that, when executed, cause the controller to detect a lower pressure input, simultaneously detect a higher pressure input, calculate a pressure differential between the lower pressure input and the higher pressure input, and move an object depicted in a display in communication with the controller based on the pressure differential.

19 Claims, 16 Drawing Sheets

PRESSURE GESTURE

FIELD OF THE DISCLOSURE

This disclosure relates generally to systems and methods for using gestures. In particular, this disclosure relates to systems and methods for using gestures in pressure sensitive applications.

BACKGROUND

A touch screen is often incorporated into electronic tablets and other devices to provide a mechanism for giving inputs to the device. The touch screens may operate using pressure sensing, which may directly manipulate objects depicted in the screen. Pressure sensors may detect pressure from on the touch screen intended by the user to be control inputs.

An example of a pressure sensor is disclosed in U.S. Pat. No. 10,296,091 issued to Robert W. Heubel, et al. This reference discloses a method of generating haptic effects includes detecting an input of pressure applied to a device using a gesture and determining a level associated with the gesture based on the pressure input, as well as determining a selection of an item at the level based on the gesture and a context associated with the item at the level, along with generating a contextual haptic effect comprising haptic parameter based on the context of the item at the level.

Another example of a pressure sensor is disclosed in U.S. Patent Publication No. 2014/0368454 issued to Regis Croisonnier, et al. This reference discloses a control method for a function of a touchpad utilizing a capture device includes measuring an analog threshold pressure value, and differentials thereof, and delivering event signals based upon the threshold pressure values and differentials thereof to execute a selected function. The capture device for remote, virtual on screen data input by hand annotation includes at least three functional layers including a bottom rigid layer, a middle pressure sensor layer, a capacitive flexible sensor layer, and a top flexible panel layer. The bottom rigid layer has a surface that provides a mechanical support for writing. The middle pressure sensor layer is adapted to measuring a pressure array or map on the capture active area and to send data representing the measured pressure to a personal computer. The top flexible touch-sensitive passive LCD display layer includes an LCD surface by which whatever is written down on the LCD is impressed graphically due to its liquid crystal physical properties wherein applied pressure changes the crystal particles orientation and light properties, such that when a stylus presses against a writing surface thereof, it leaves a visible trace allowing the user to produce a drawing though no real ink has flown.

Another example of a pressure sensor is disclosed in U.S. Pat. No. 10,156,921 issued to Michael S. Smith, et al. This reference discloses apparatuses and a computer-readable media are provided to display an object and at least a portion of an interface in a same virtual display layer; detect a single static gesture being applied to the touch screen on the object; in the event that a magnitude of the pressure of the single static gesture being applied to the touch screen on the object is less than a first magnitude threshold, perform an operation; in the event that the magnitude of the pressure of the single static gesture being applied to the touch screen on the object is greater than the first magnitude threshold and is less than a second magnitude threshold, blur, as a function of an increase in the magnitude of the pressure of the single static gesture being applied to the touch screen on the object, the at least portion of the interface, and display the at least portion of the interface and the object in different virtual display layers; and in the event that the magnitude of the pressure of the single static gesture being applied to the touch screen on the object is greater than the second magnitude threshold, vibrate the apparatus and perform another operation.

Another example of a pressure sensor is disclosed in U.S. Pat. No. 9,619,044 issued to Matthew Dominic Tenuta, et al. This reference discloses a trackpad device includes a top surface, a capacitive sensor operably coupled to the top surface, a resistive sensor disposed below the capacitive sensor and at least one controller operably coupled to the capacitive sensor and to the resistive sensor. The at least one controller and the capacitive sensor are configured to detect one or more objects on the top surface. The at least one controller and the resistive sensor are configured to detect the one or more objects on the top surface independent of the detection by the at least one controller and the capacitive sensor. The at least one controller is configured to determine locations of the one or more objects on the top surface using information from the detection by the at least one controller and capacitive sensor and information from the detection by the at least one controller and the resistive sensor. Each of these references are herein incorporated by reference for all that they disclose.

SUMMARY

In one embodiment, a device may include a pressure sensor; a user interface including an input surface opposite to an underside of the user interface, where the underside is positioned near the pressure sensor; a controller; memory in communication with the controller and including programmed instructions that, when executed, cause the controller to detect a lower pressure input, simultaneously detect a higher pressure input, calculate a pressure differential between the lower pressure input and the higher pressure input, and move an object depicted in a display in communication with the controller based on the pressure differential.

Moving the object depicted in the display may include moving a cursor depicted in the display.

Moving the object depicted in the display may include moving an indicator of a virtual control panel.

Moving the object depicted in the display may include moving a virtual three-dimensional object depicted in the display.

Moving the object depicted in the display may include moving the object from a first two-dimensional coordinate in the display to a second two-dimensional coordinate in the display.

Moving the object depicted in a display may include rotating the object from a first angular orientation in the display to a second angular orientation in the display.

The programmed instructions, when executed, further may cause the controller to detect a relative position on the input surface between the lower pressure input and the higher pressure input, calculate a direction based, at least in part, on the relative position, and cause the object depicted in the display to move in the calculated direction in the display.

Causing the object to move in the calculated direction may include rotating the object in the calculated direction.

Causing the object to move in the calculated direction may include moving the object from a first two-dimensional coordinate in the display to a second two-dimensional coordinate in the display.

Calculating the direction may include identifying a first position of the lower pressure input on the input surface; identifying a second position of the higher pressure input on input surface; calculating an angle between the first position and the second position on the input surface; and calculating the direction in the display based, at least in part, on the calculated angle from the input surface.

At least one of the lower pressure input and the higher pressure input may be relatively static on the input surface with respect to the pressure sensor.

Moving the object depicted in a display may include moving the object at a speed that correlates with the magnitude of the pressure differential.

The device may include a capacitance sensor positioned near the underside of the input surface where the pressure sensor is capable of detecting changes to pressure and the capacitance sensor may be capable of detecting changes to a proximity of an external object adjacent the input surface based, at least in part, on changes to capacitance.

In one embodiment, a method of using a pressure gesture may include detecting a lower pressure input on a pressure sensitive surface, simultaneously detecting a higher pressure input on the pressure sensitive surface, calculating a pressure differential between the lower pressure input and the higher pressure input, and moving an object depicted in a display in communication with the pressure sensitive surface based on the pressure differential.

Moving the object depicted in a display may include moving a cursor depicted in the display.

Moving the object depicted in a display may include moving an indicator of a virtual control panel.

Moving the object depicted in a display may include moving a virtual three-dimensional object depicted in the display.

Moving the object depicted in a display may include moving the object from a first two-dimensional coordinate in the display to a second two-dimensional coordinate in the display.

Moving the object depicted in a display may include rotating the object from a first angular orientation in the display to a second angular orientation in the display.

In one embodiment, a computer-program product may have a non-transitory computer-readable medium storing instructions executable by a processor to detect a lower pressure input on a pressure sensitive surface; simultaneously detect a higher pressure input on the pressure sensitive surface; calculate a pressure differential between the lower pressure input and the higher pressure input; detect a relative position on the input surface between the lower pressure input and the higher pressure input; calculate a direction based, at least in part, on the relative position; and move an object depicted in a display in communication with the pressure sensitive surface based on the pressure differential and the calculated direction.

In one embodiment, a device may include a pressure sensor; a user interface including an input surface opposite to an underside of the user interface, where the underside is positioned near the pressure sensor; a controller; memory in communication with the controller and including programmed instructions that, when executed, cause the controller to detect a higher pressure input from a first object; simultaneously detect a lower pressure input from a second object that is different from the first object when the higher pressure input is detected; calculate a pressure differential between the higher pressure input and the lower pressure input; and adjust a parameter of the device based, at least in part, on the pressure differential.

The parameter may be increased when the higher pressure is located nearer to a first side of the lower pressure input.

The parameter may be decreased when the higher pressure is located nearer to a second side of the lower pressure input, wherein the first side is different and opposite to the first side.

The parameter may be turned on when the higher pressure is located nearer to a first side of the lower pressure input.

The parameter may be turned off when the higher pressure is located nearer to a second side of the lower pressure input, wherein the first side is different and opposite to the first side.

The parameter may be a display brightness level.
The parameter may be an audio volume level.
The parameter may be a power mode.
The parameter may be a zoom level.
The parameter may be a camera setting.
The parameter may be a microphone setting.

The device may include a capacitance sensor positioned near the underside of the input surface where the pressure sensor is capable of detecting changes to pressure and the capacitance sensor is capable of detecting changes to a proximity of an external object adjacent the input surface based, at least in part, on changes to capacitance.

In one embodiment, a method of using a pressure gesture may include detecting a higher pressure input from a first object in a pressure sensitive surface; simultaneously detecting a lower pressure input from a second object in a pressure sensitive surface that is different from the first object when the higher pressure input is detected; calculating a pressure differential between the higher pressure input and the lower pressure input; and adjusting a parameter of the device based, at least in part, on the pressure differential.

The parameter may be increased when the higher pressure is located nearer to a first side of the lower pressure input.

The parameter may be decreased when the higher pressure is located nearer to a second side of the lower pressure input, wherein the first side is different and opposite to the first side.

The parameter may be turned on when the higher pressure is located nearer to a first side of the lower pressure input.

The parameter may be turned off when the higher pressure is located nearer to a second side of the lower pressure input, wherein the first side is different and opposite to the first side.

In one embodiment, a computer-program product may include a non-transitory computer-readable medium storing instructions executable by a processor to detect a higher pressure input from a first object in a pressure sensitive surface; simultaneously detect a lower pressure input from a second object in a pressure sensitive surface that is different from the first object when the higher pressure input is detected; calculate a pressure differential between the higher pressure input and the lower pressure input; and adjust a parameter of the device based, at least in part, on the pressure differential The instructions, when executed may cause the processor to detect a relative position between the lower pressure input and the higher pressure input and adjust the parameter in a direction based at least in part on the pressure differential and the relative position.

The instructions, when executed may cause the processor to increase the parameter when the higher pressure is located nearer to a first side of the lower pressure input.

Figure 1:
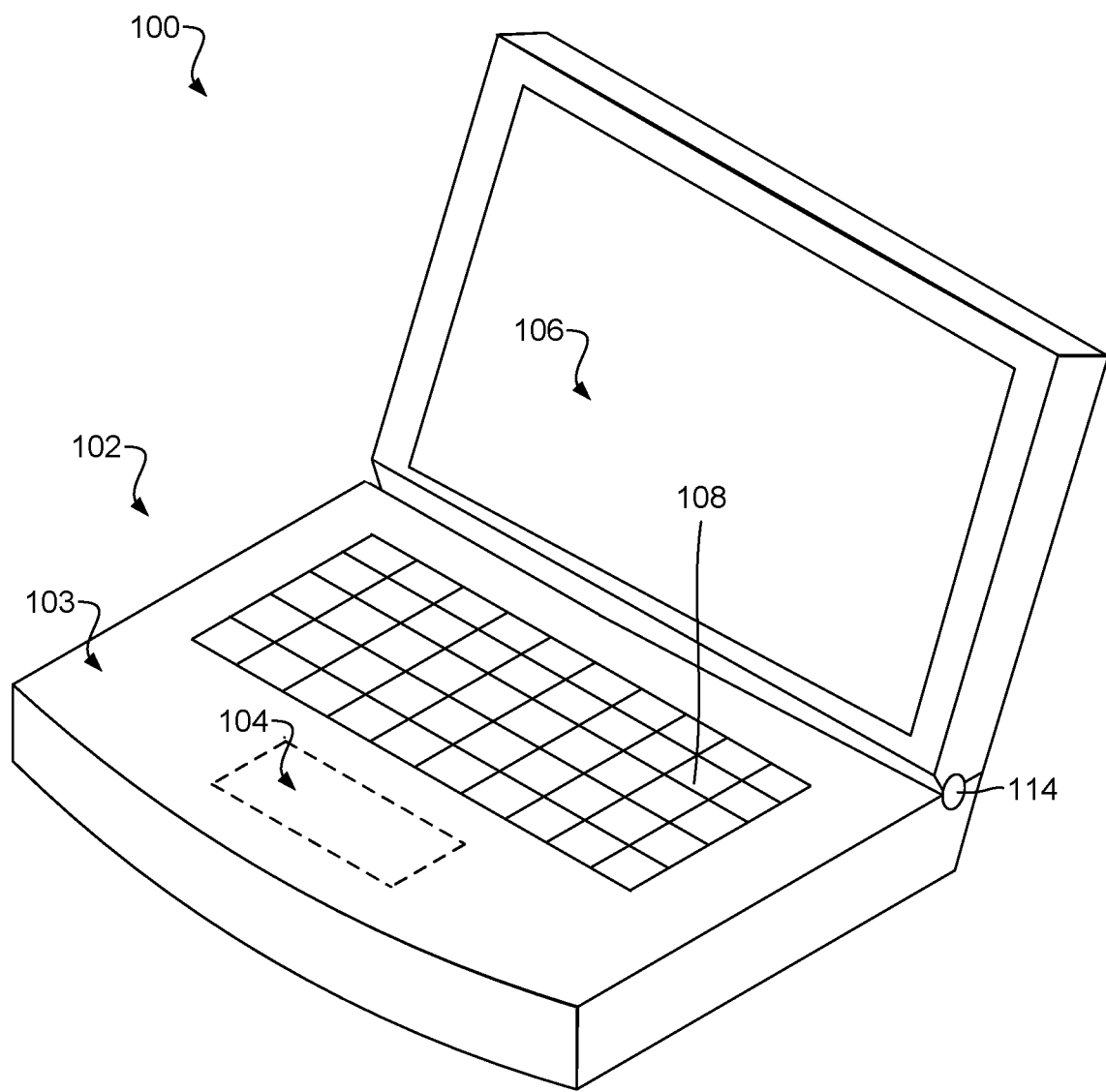
FIG. 1 depicts an example of a portable electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "portable electronic device" may generally refer to devices that can be transported and include a battery and electronic components. Examples may include a laptop, a desktop, a mobile phone, an electronic tablet, a personal digital device, a watch, a gaming controller, a wearable device, another type of device, or combinations thereof.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "trackpad", "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the sensor is located within a housing. The sensor may be underneath the housing and capable of detecting objects outside of the housing. For example, the sensor may be disclosed within a cavity formed by a keyboard housing of a computer, such as a laptop or other type of computing device, and the sensor may be disposed underneath a surface of the keyboard housing. In some examples, an opening may be formed in the housing, and an overlay may be positioned within the opening. In such an example, the sensor may be positioned under the overlay, and the sensor may sense the presence of the object through the overlay. For the purposes of this disclosure, the term "input surface" may generally refer to a surface through which a pressure sensor, a capacitance sensor, or another type of sensor senses a pressure, a presence, a position, or another characteristic that the indicates an input from the user. For example, the input surface may be a housing, an overlay, or another type of surface through which the input is sensed. In some examples, the input surface has no moving parts. In some examples, the input surface may be made of any appropriate type of material, including, but not limited to, plastics, glass, a dielectric material, a metal, another type of material, or combinations thereof.

For the purposes of this disclosure, the term "lower pressure input" may generally refer to a pressure input that measures at a comparatively lower pressure value than another pressure input that is received during the same time period through the input surface. For the purposes of this disclosure, the term "higher pressure input" may generally refer to a pressure input that measures at a comparatively higher pressure value than another pressure input that is received during the same time period. For the purposes of this disclosure, the term "simultaneously" may generally refer to at least an overlap of time. For example, if the higher and lower pressure inputs are simultaneously received, each of these inputs are made at some point of time that overlaps. In some cases, both inputs begin at the same time and end at the same time. In other examples, one of the inputs may start at a different time than the other. One of the inputs may end at a different time than the other. For example, the first input may begin before the second input is started, and the first input may conclude after the second input ends. In another example, the first input may begin before the second input is started, and the first input may conclude before the second input ends. The time interval during which the first input is made may have at least some overlap with the time interval during which the second input is made.

For the purposes of this disclosure, the term "display" may generally refer to a display or screen that is not depicted in the same area as the input surface. In some cases, the display is incorporated into a laptop where a keyboard is located between the display and the input surface. In some examples where the input surface is incorporated into a laptop, the input surface may be part of a touch pad. Pressure sensors may be integrated into the stack making up the touch pad. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the input surface, and in other examples, the display is located on another device that is different from the device on which the input surface is located. For example, the display may be projected onto a different surface, such as a wall or projector screen. In some examples, the input surface is located on a input or gaming controller, and the display is located on a wearable device, such as a virtual reality or augmented reality screen. In some cases, the input surface and the display are located on the same surface, but on separate locations on that surface. In other examples, the input surface and the display may be integrated into the same device, but on different surfaces. In some cases, the input surface and the display may be oriented at different angular orientations with respect to each other.

For the purposes of this disclosure, the term "indicator" may generally refer to any appropriate type of indicator that indicators the status or level of an adjustable parameter of the device. For example, the indicator may represent an audio level, a brightness level, a font size, a zoom in/out percentage, another type of parameter, or combinations thereof. Any appropriate type of indicator may be used, including, but not limited to, a slider, a dial, a percentage, a check mark, a fill-in box, an arrow, another type of indicator, or combinations thereof. In some cases, the indicator may depict whether a mode or function is turned on or off.

For the purposes of this disclosure, the term "virtual three-dimensional object" may generally refer to digital image of a device, a digital icon, a model, a CAD model, an avatar, another type of digital image, or combinations thereof.

For the purposes of this disclosure, the term "relative position" may generally refer to the positions of the inputs with respect to each other. For example, if a first input is located at the center coordinate of the input surface, and the second input is located two inches in a positive x-direction and two inches in a positive y-direction, the relative position of the two inputs may be spaced apart from each other at approximately 2.83 inches at a positive 45-degree angle. This relative position may be used to move the object in the display. For example, if the relative position is a 45-degree angle, the object in the display may be moved in a direction that forms a 45-degree angle with a reference point in the display. In some examples, the direction of the movement may be determined based on the relative pressures of the two inputs. For example, in some cases the direction moves away from the lower pressure input towards the higher pressure input. In such a case, if the lower pressure input is at the central coordinate, and the higher pressure input is relatively positioned at a positive 45-degree angle away from the lower pressure input, the direction may be to the right and up in the input surface. A similar movement may be mimicked on the display by moving the object or rotating the object in a rightward, upward movement along a 45-degree trajectory or rotation. On the other hand, if the higher pressure input is located at the central coordinate, and the lower pressure input is relatively positioned at a positive 45-degree angle away from higher pressure input, the direction may be reversed. In this case, the object in the display may be moved in a leftward, downward movement along a 45-degree trajectory or rotated in that direction. While this explanation has been described with reference to a few specific examples, the relative position, angle, and direction may be at any appropriate position, angle, and direction.

For the purposes of this disclosure, the term "relatively static" may generally refer to an input that stays within the same basic area. As a finger is pressed onto an input surface, the user may intend to keep the finger in a stationary location on the input surface, however, the user may fail to keep his or her finger completely stationary due to finger wobble or other movements. However, these minor movements may not significantly affect the location of the input. Thus, an input from an object onto the input surface may be relatively static even if such input includes some wobble and minor movements.

FIG. 1 depicts an example of a portable electronic device 100. In this example, the portable electronic device is a laptop. In the illustrated example, the portable electronic device 100 includes input components, such as a keyboard 102 and a touch pad 104 that are integrated into a housing 103. The portable electronic device 100 also includes a display 106. A program operated by the portable electronic device 100 may be depicted in the display 106 and controlled by a sequence of instructions that are provided by the user through the keyboard 102 and/or through the touch pad 104. An internal battery (not shown) may be used to power the operations of the portable electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 may include a capacitance sensor disposed underneath a surface containing the keyboard 102. In some examples, the touch pad 104 is located in an area of the keyboard's surface where the user's palms may rest while typing. The capacitance sensor may include a printed circuit board that includes a first layer of electrodes oriented in a first direction and a second layer of electrodes oriented in a second direction that is transverse the first direction. These layers may be spaced apart and/or electrically isolated from each other so that the electrodes on the different layers do not electrically short to each other. Capacitance may be measured at the overlapping intersections between the electrodes on the different layers. However, as the user's finger or other electrically conductive objects approach the intersections, the capacitance may change. These capacitance changes and their associated locations may be quantified to determine where the user is touching or hovering his or her finger within the area of the touch pad 104. In some examples, the first set of electrodes and the second set of electrodes are equidistantly spaced with respect to each other. Thus, in these examples, the sensitivity of the touch pad 104 is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may include a capacitance sensor that is located behind an outside surface of the display 106. As a user's finger or other electrically conductive object approaches the touch sensitive screen, the capacitance sensor may detect a change in capacitance as an input from the user.

While the example of FIG. 1 depicts an example of the portable electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, another type of portable electronic device, another type of device, or combinations thereof.

Figure 2:
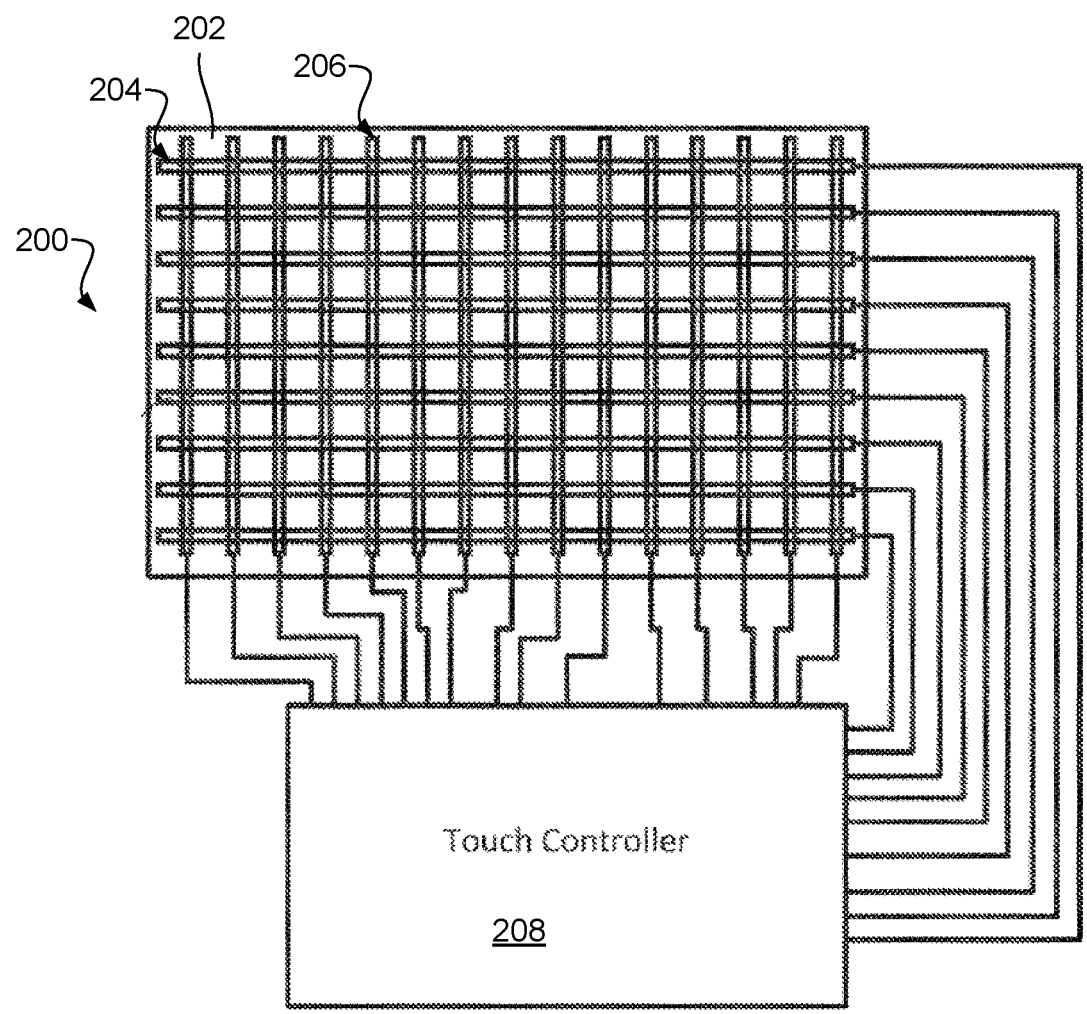
FIG. 2 depicts an example of a substrate with a first set of electrodes and a second set of electrodes in accordance with the disclosure.

FIG. 2 depicts an example of a portion of a touch input component 200. In this example, the touch input component 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The touch input component 200 may include one or more electrodes in the first set 204 or the second set 206. Such a substrate 202 and electrode sets may be incorporated into a touch screen, a touch pad, and/or swell detection circuitry incorporated into a battery assembly.

In some examples, the touch input component 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the touch input controller 208 includes a touch controller 208. The touch controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the touch controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A ground plane shield (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the touch input component 200. The touch input component 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the touch input component 200, the touch controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the touch input component 200 having the flexibility of the switching the sets 204, 206 of electrodes between sense and transmit electrodes, in other examples, each set of electrodes is dedicated to either a transmit function or a sense function.

Figure 3:
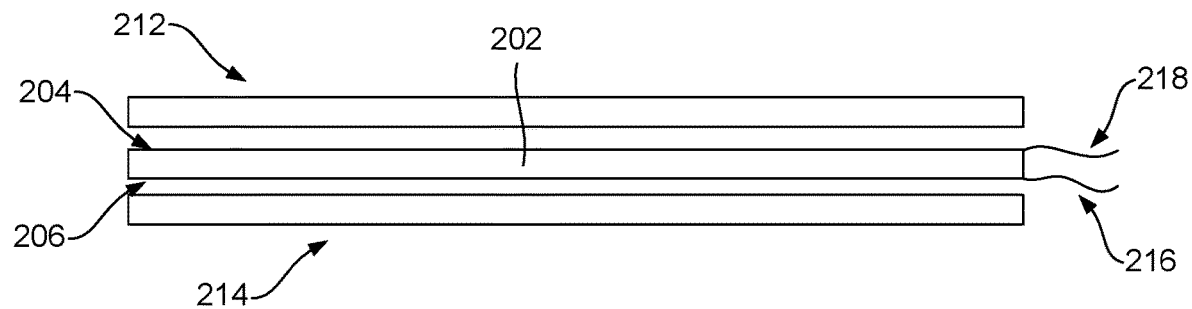
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a touch pad. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a touch pad, the substrate 202 may be located between a touch surface 212 and a shield 214. The touch surface 212 may be a covering that is placed over the first side of the substrate 202 and that is at least partially transparent to electric fields. As a user's finger or stylus approach the touch surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the portable electronic device. This shield may prevent influence on the electric fields on the substrate 202.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

Figure 4:
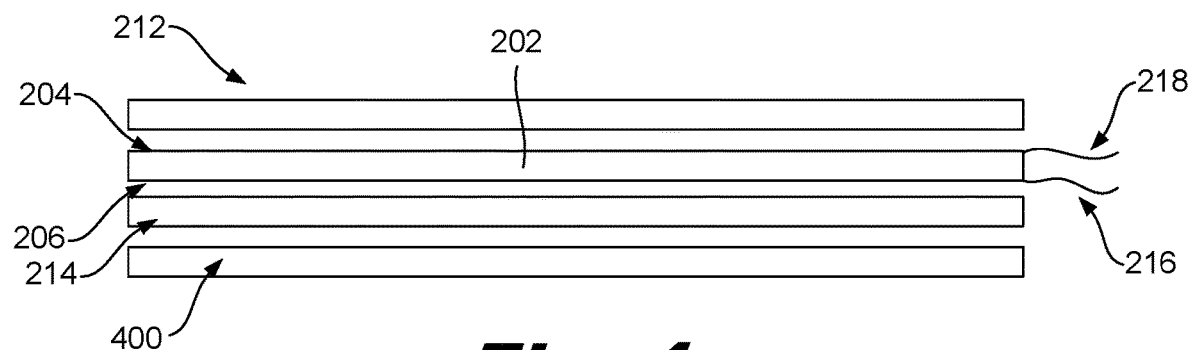
FIG. 4 depicts an example of a touch screen in accordance with the disclosure.

FIG. 4 depicts an example of a touch screen as the touch input controller. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display 400. The display 400 may be a layer of pixels or diodes that illuminate to generate an image. The display may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the touch surface 212 may all be at least partially transparent to allow the display to be visible to the user through the touch surface 212. Such a touch screen may be included in a monitor, a display assembly, a laptop, a mobile phone, a mobile device, an electronic tablet, another type of portable electronic device, or combinations thereof.

Figure 5:
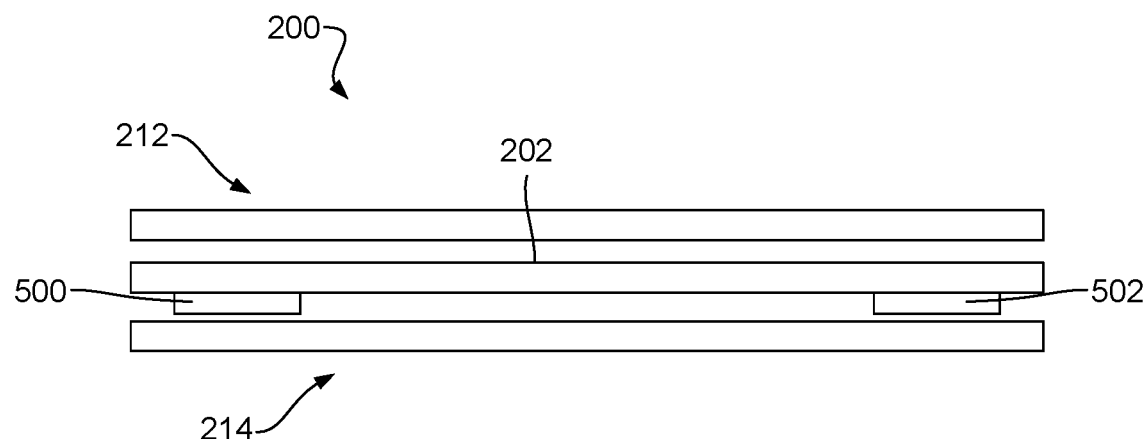
FIG. 5 depicts an example of an input surface in accordance with the disclosure.

FIG. 5 depicts an example of a cross section of a touch pad 200 where the substrate 202 may be located between a touch surface 212 and a shield 214. In this example, a first pressure sensor 500 and a second pressure sensor 502 are incorporated into the touch pad 200. As depicted in this example, the pressure sensors 500, 502 may be disposed adjacent to an underside of the substrate 202. But, in other examples, the pressure sensors may be positioned at any appropriate location, including, but not limited to, adjacent the underside of the touch surface 212, adjacent the underside of the shield, another location, or combinations thereof. In examples where the pressure sensors 500, 502 are positioned under the substrate 202, pressure applied to the touch surface 212 may be transmitted through the touch surface 212 exerting a pressure on the substrate 202, which in turn applies a pressure to at least one of the pressure sensors 500, 502. In examples where the pressure sensors are positioned adjacent to the shield, the pressure applied to input surface may be transmitted to the shield, which in turn applies the pressure to the pressure sensors. This pressure may be measured by the pressure sensors 500, 502 to determine the value of the pressure. In this example, the first pressure sensor 500 is spaced apart from the second pressure sensor 502 at a distance along a length, width, and/or another dimension of the touch surface 212, which may allow the first pressure sensor 500 and the second pressure 502 to detect different levels of pressure depending on the location where the pressure input is made on the touch surface 212. In some cases, those pressure sensors that are closer to the location where the pressure input is made can detect a greater pressure force than the pressure sensor that is located farther away. The differing pressure values may help determine where the pressure input is made.

While this example is depicted with a pressure sensor incorporated into a touch pad stack with a capacitance sensor, in other examples, the pressure sensors are not incorporated with a capacitance sensor. Further, any appropriate type of pressure sensor may be used in accordance with the principles described herein. For example, a non-exhaustive list of suitable pressure sensors includes, but is not limited to, piezoelectric sensors, magnostrictive sensors, potentiometric pressure sensors, inductive pressure sensors, capacitive pressure sensors, strain gauge pressure sensors, variable reluctance pressure sensors, other types of pressure sensors, or combinations thereof.

Figure 6:
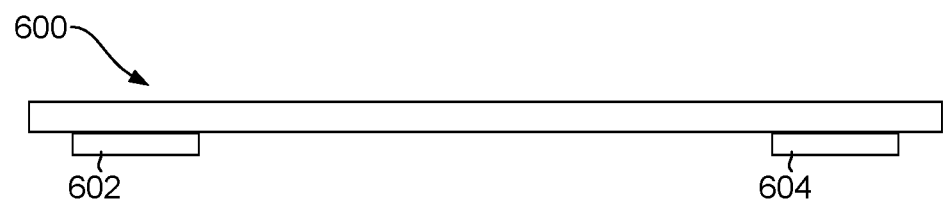
FIG. 6 depicts an example of an input surface in accordance with the disclosure.

In some examples, the pressure sensor may also include an ability to provide a haptic feedback. For example, a piezoelectric device may be used as both a pressure sensor and as a haptic device. When the piezoelectric material is compressed due to the application of pressure, the piezoelectric material may produce an electric signal with can be detected by the controller. In some cases, the controller may produce an electric signal that is sent to the piezoelectric material to cause the piezoelectric material to expand and/or vibrate. The vibrations from the piezoelectric material may cause the input surface to vibrate. This vibration may communicate a haptic signal to the user. However, in some examples, the pressure sensors are not configured to provide a haptic FIG. 6 depicts an example of an input surface 600. In this example, a first pressure sensor 602 and a second pressure sensor 604 are located adjacent to the input surface 600. In this example, the first pressure sensor 602 and the second pressure sensor 604 are not incorporated into a stack with other types of sensors.

Figure 7:
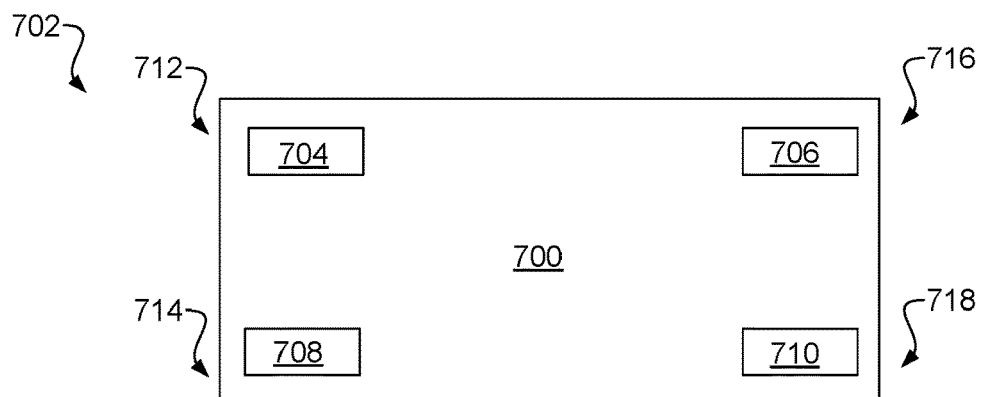
FIG. 7 depicts an example of an arrangement of pressure sensors in accordance with the disclosure.
Figure 8:
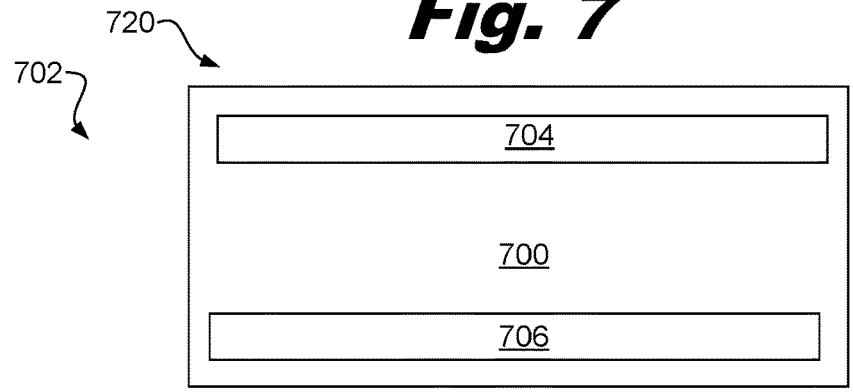
FIG. 8 depicts an example of an arrangement of pressure sensors in accordance with the disclosure.
Figure 9:
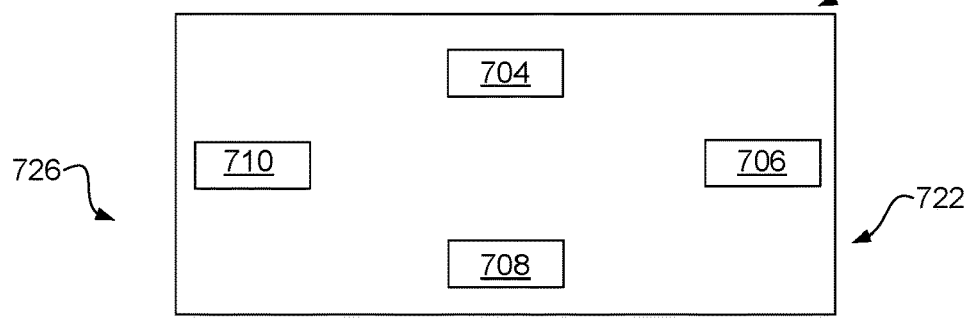
FIG. 9 depicts an example of an arrangement of pressure sensors in accordance with the disclosure.
Figure 10:
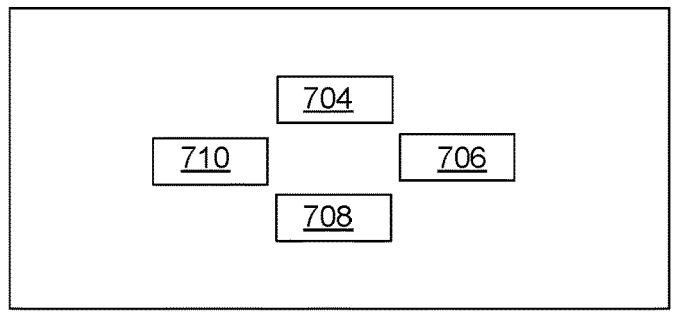
FIG. 10 depicts an example of an arrangement of pressure sensors in accordance with the disclosure.

FIGS. 7-10 depict examples of pressure sensors depicted on an underside 700 of an input surface 702. In the example of FIG. 7, the input surface 702 has a rectangular shape and pressure sensors 704, 706, 708, 710 are positioned in each of the corners 712, 714, 716, 718. In the example of FIG. 8, just a first pressure sensor 704 is depicted on a first side 720, and a second pressure sensor 706 is depicted on a second side 722 of the input surface 702. In the example of FIG. 9, the pressure sensors 704, 706, 708, 710 are depicted in the center of the first side 720, the second side 722, the third side 724, and the fourth side 726. In the examples of FIG. 10, the pressure sensors 704, 706, 708, 710 are depicted towards the center of the input surface and away from the edges and corners of the input surface 702.

While the examples in FIGS. 7-10 are described with reference to a specific number of pressure sensors, any appropriate number of pressure sensors may be disposed adjacent to the input surface. For example, the number of pressure sensors may include one pressure sensor or multiple pressure sensors. While the examples depicted above are described with reference to specific patterns and locations for the pressure sensors, other arrangements are contemplated including, but not limited to, symmetric distribution of sensors, an asymmetric distribution of sensors, other distributions and patterns of sensors, or combinations thereof.

Figure 11:
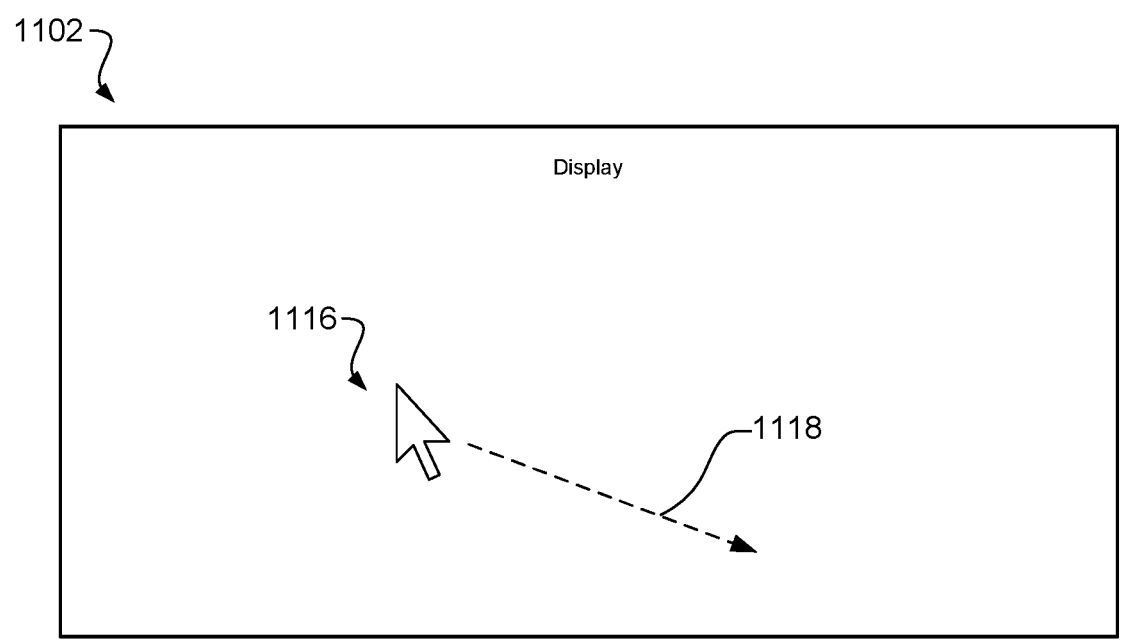
FIG. 11 depicts an example of moving a cursor in accordance with the disclosure.
Figure 11:
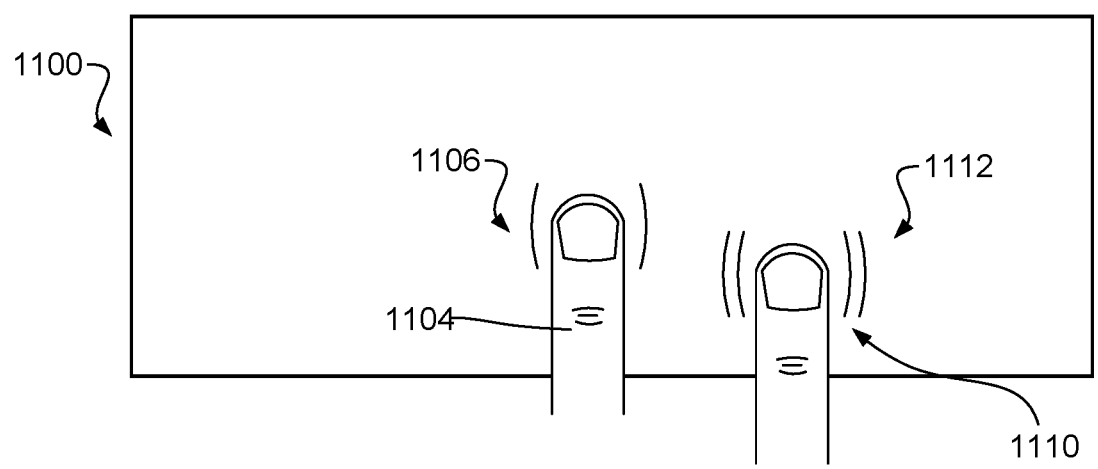

FIG. 11 depicts an example of an input surface 1100 and a display 1102 in communication with the input surface 1100. In this example, a first finger 1104 applies a first pressure input 1106 into a central location of the input surface 1100. A second finger 1110 applies a second pressure input 1112 into a different location of the input surface 1100. In this example, the first pressure input 1106 is a comparatively lower pressure input, and the second pressure input 1112 is a comparative higher pressure input.

In this example, the object depicted in the display 1102 that is moved is a cursor 1116. In this example, the higher pressure input is located to the right and lower on the input surface than the lower pressure input. In this case, the system interprets the pressure differential gesture to be a command to move the cursor in a direction (represented by line 1118) that mimics the relative position between the first and second inputs 1106, 1112. Thus, in this case, the cursor is moved to the right towards the bottom of the display 1102. The system may determine the angle between the lower pressure input and the higher pressure input, and cause the cursor to move to the lower right at an angle that is at least similar to the angle between the higher and lower pressure inputs.

The system may determine that there is a pressure differential by detecting that more than one pressure inputs are being made on the input surface. In some cases, the pressure inputs may be started at relatively the same time, or one of the pressure inputs may be started at some time after the first pressure input is made. In response to determining that more than one pressure input is being made on the input surface, each pressure value may be determined. If there is a difference between the first pressure input's value and the second pressure input's value, the system may determine that the user is making an input to cause an object in the display to move. In some cases, the direction of the movement is determined by the relative location between the higher pressure input and the lower pressure input. For example, if the system follows a rule stating that the object moves away from the lower pressure input, and if the higher pressure input is located to the right of the lower pressure input, then the object is moved to the right. Similarly, if the system follows a rule stating that the object moves away from the higher pressure input, and if the higher pressure input is located to the right of the lower pressure input, then the object is to be moved to the left.

In some cases, the speed of the object's movement may be determined by the value of the differential pressure. In those examples where the differential pressure is higher, the object may be moved at a faster speed than if the differential pressure had a smaller value.

In some cases, the object to be moved in the display is always the same object, such as a cursor or a parameter indicator. In other examples, the user may select and/or change the object to be moved. In some cases, the object to be moved is application specific. In such a case, the object to be moved changes based on the application running on the device. For example, an application may include a game that involves moving a vehicle, an avatar, another type of object or combinations thereof. In such an application, the user may use the pressure differential gestures as arrow keys to direct way the game's objects move, where to aim a projectile in the game, where to rotate an object in the game, or perform some other action in the game.

In some examples, the first and second inputs are made with styluses, fingers, or other objects to apply pressure to the input surface. In some cases where fingers are used to apply the pressure, the user may use two different fingers on the same hand to make the pressure differential gesture. In other examples, the user may use fingers from both hands to make the pressure differential gesture.

In examples where the object is moved from a first two-dimensional location to a second two-dimensional location on the display, the object may be moved as long as both pressure inputs are still being made. In examples where the pressure differential changes (i.e., one of the pressure inputs increases or decreases), the speed at which the object moves may change accordingly. For example, if the pressure differential's value increases, the object's speed may increase. On the other hand, if the pressure differential's value decreases, the object's speed may decrease. In some examples, the object is only moved a distance that relates to the distance between the first input and the second input. For example, if the first input and the second input are spaced apart from each other two inches on the input display, the system may interpret that the user is giving a command to move the object two inches. In other examples, the input surface distance and the display object's distance may not be a 1 to 1 ratio, but may be another appropriate ratio.

Figure 12:
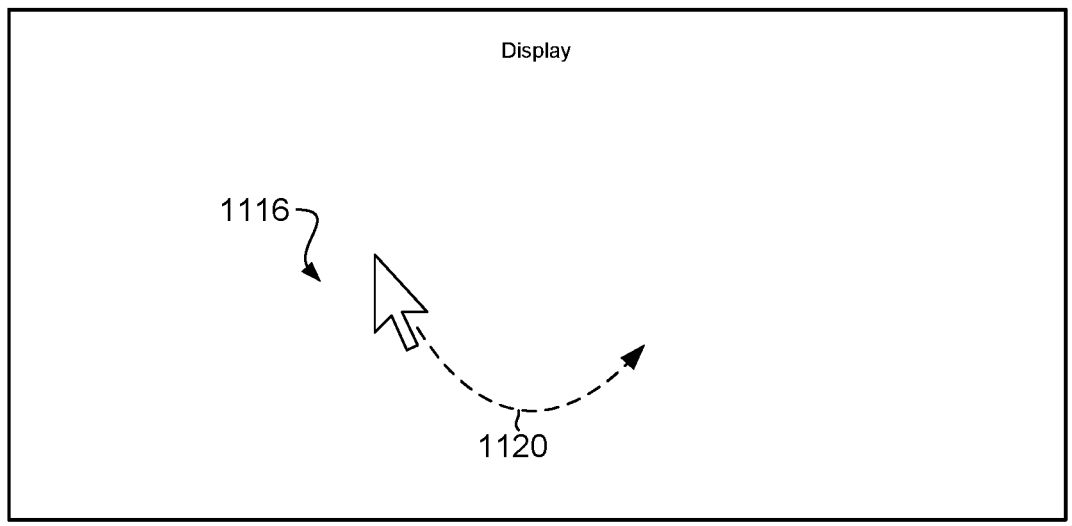
FIG. 12 depicts an example of moving a cursor in accordance with the disclosure.
Figure 12:
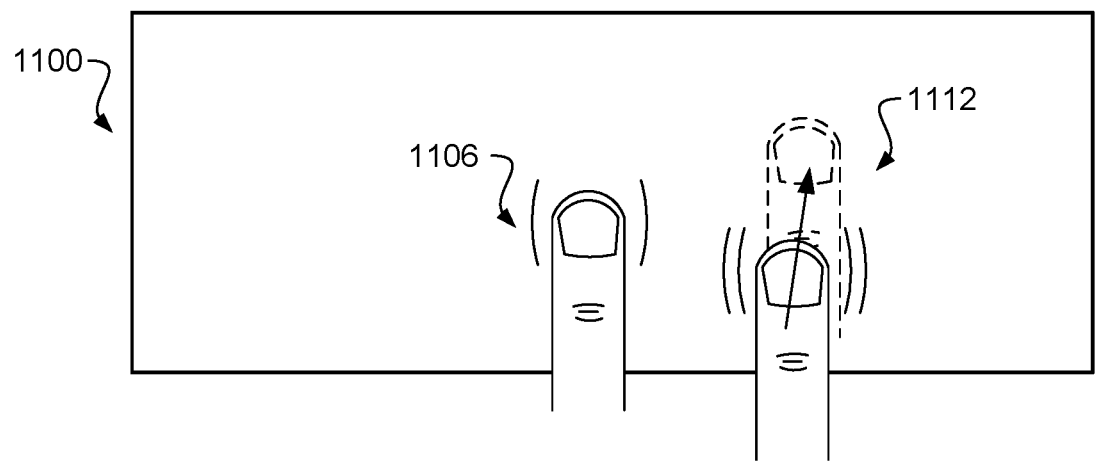

FIG. 12 depicts an example where a differential pressure is made with a first pressure input 1106 and a second pressure input 1112. In this example, the first input is a lower pressure input, and the second input is a higher pressure input. In some cases, at least the lower pressure input, the higher pressure input, or both inputs are relatively static with respect to the two-dimensional coordinates of the input surface 1100. In the example depicted in FIG. 12, the lower pressure input remains relatively static, and the higher pressure input moves while the pressure is still being applied to the input surface 1100. This may cause the cursor 1116 (or the other object to be moved) to move in a non-linear direction. The cursor may initially move in the direction of the original angle formed by the relative positions of the first and second inputs, but over time, the relative angle changes as the higher pressure input moves. In this case, the angle determined by the relative positions of the pressure inputs also changes. As the angle changes, the direction of the cursor may change to reflect the new angle. As a result, the cursor may be moved along a curved path represented by line 1120.

While this example has been described with reference to the higher pressure input changing its position; in other examples, the lower pressure input may move to cause the angle formed by the relative input positions to change. Such changes to the lower pressure input's position may also result in a change in the cursor's direction.

Figure 13:
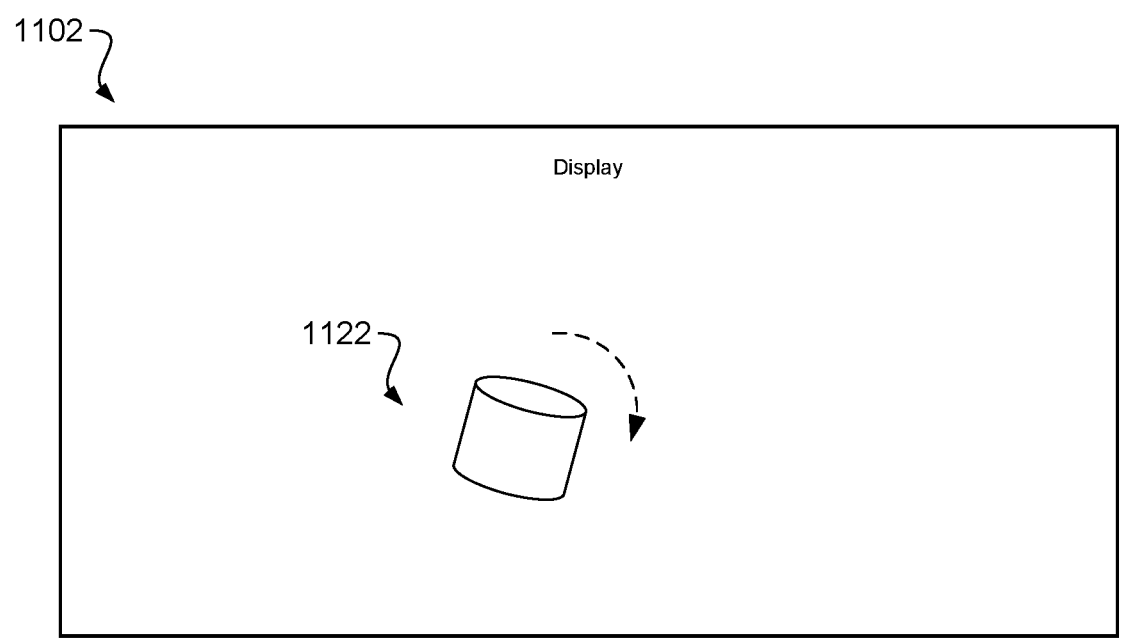
FIG. 13 depicts an example of moving a virtual three-dimensional object in accordance with the disclosure.
Figure 13:
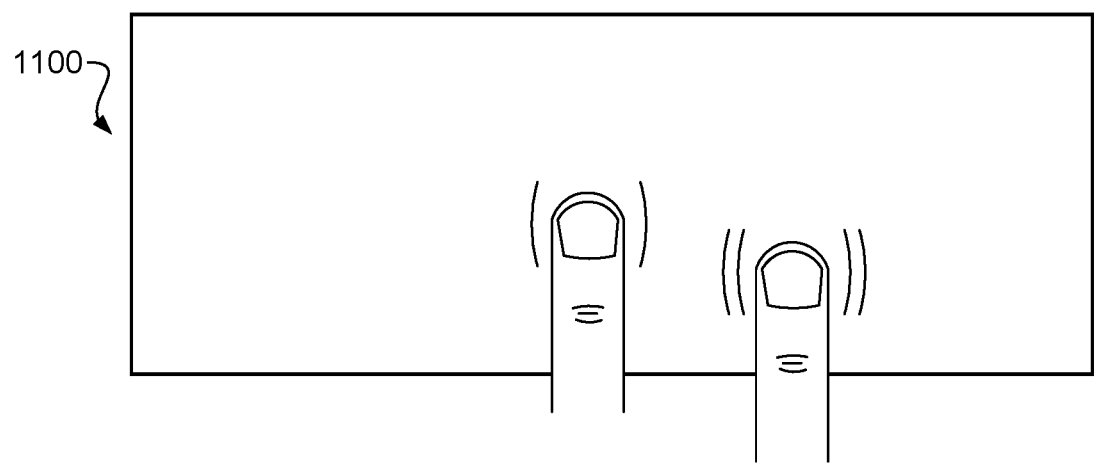

FIG. 13 depicts an example of a differential pressure gesture being made on an input surface 1100. In this example, the higher pressure input is made to the bottom right of the lower pressure input on the input surface 1100. In this particular example, such an input is interpreted to cause the object 1122 depicted in the display 1102 to rotate towards the bottom right. The object 1122 may rotate in a direction that is derived from the angle of the relative positions of the higher and lower pressure inputs. In some cases, the object 1122 may rotate while both pressure inputs are being made. In other examples, the object 1122 may rotate for a specific distance or time derived from the distance between higher and lower pressure inputs on the input surface. In some cases, the speed at which the object 1122 rotates may be determined based on the value of the pressure differential.

In this example, the object 1122 depicted in the display 1102 is virtual three-dimensional object, such as a CAD model or another type of object in modeling software. In some examples, the system may be configured to cause a two-dimensional object to rotate within the display based on the differential pressure gesture. In another examples, the virtual three-dimensional object may be an object that is part of a game, a demonstration, a presentation, another type of virtual three-dimensional object, or combinations thereof.

Figure 14:
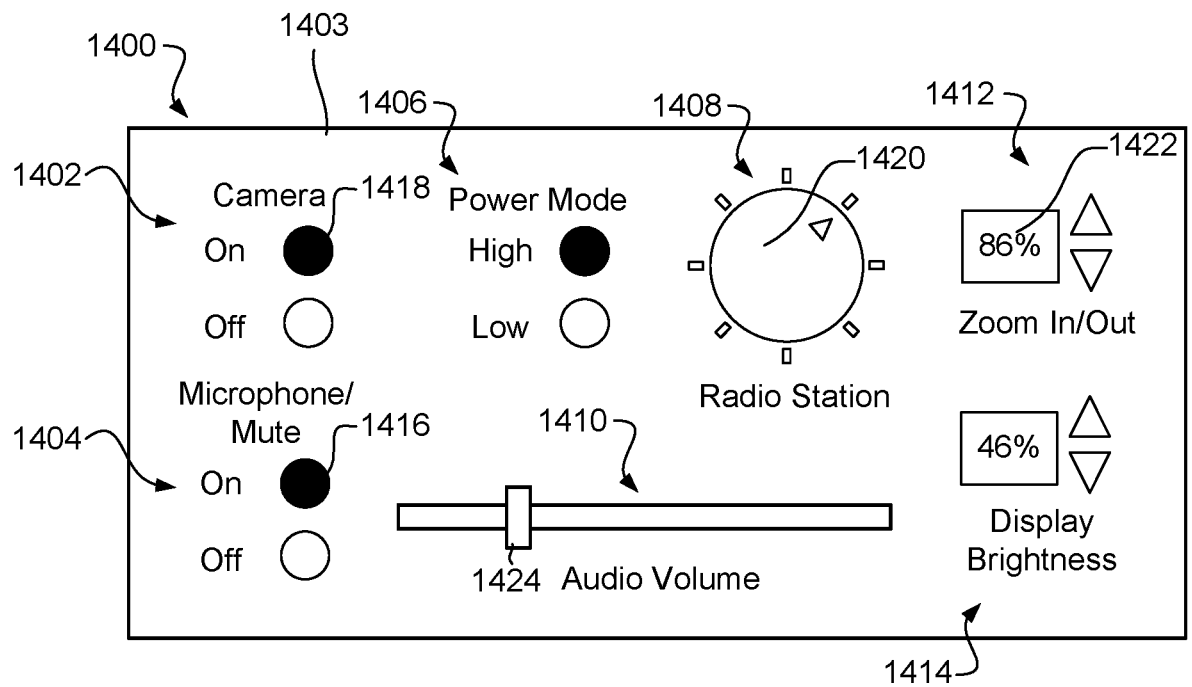
FIG. 14 depicts an example of a control panel in accordance with the disclosure.
Figure 14:
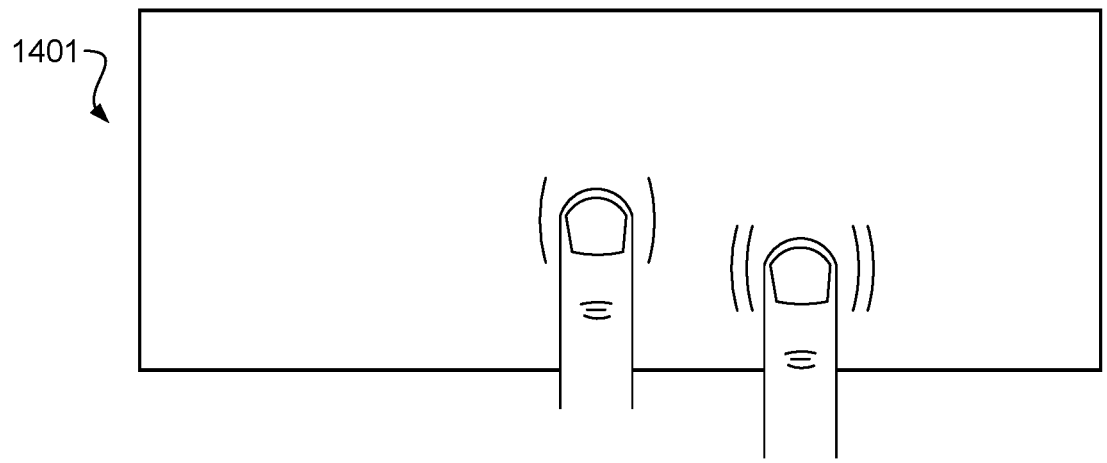

FIG. 14 depicts an example of indicators on a virtual control panel 1400. The control panel may show the current settings on the device that incorporates the input surface 1401, the display 1403, another device, or combinations thereof. In some cases, the pressure differential may be used to control one or more of the parameters depicted in the control panel.

In the example of FIG. 14, the control panel 1400 may include a camera setting 1402, a microphone/mute setting 1404, a power setting 1406, a radio station setting 1408, an audio volume setting 1410, a zoom in/out setting 1412, and a brightness setting 1414. While this example depicts specific settings, in other examples, more or fewer settings may be included in the control panel.

In some examples, the system may be configured to change a move a position of an indicator depicted in the control panel 1400. In such an example, the indicator may be an object that is moved by the differential pressure input. For example, if the pressure differential input is interpreted to move the object to the right, the indicator may be used to the right. In some cases, moving the indicator to the right may turn on a mode of a setting, may turn off a mode of the setting, may increase a level of the setting, may decrease a mode of a setting, or combinations thereof. Further, moving the indicator to the left may turn on a mode of a setting, may turn off a mode of the setting, may increase a level of the setting, may decrease a level of a setting, or combinations thereof.

In some examples, the system may interpret differential pressure inputs to be commands to perform a predefined task, such as move a cursor or move another type of object under default circumstances. In other examples, the user may select an option of what task the default differential pressure input performs. For example, in some cases, a default parameter may be to move the cursor in a laptop display. However, under the conditions where a conference call application is running on the laptop, the system may automatically switch to interpret the differential pressure inputs to move indicators associated with the conference call application, such as a camera mode, a microphone mode, and so forth. In some cases, when the conference call application is running, the microphone indicator 1416 may become the default parameter to be moved. In the example of the control panel 1400 depicted in FIG. 14, the microphone may be turned on or off. Thus, the user may participate in the conference call in mute until the user desires to switch the microphone setting to say something in the meeting. To do so, the user may apply the differential pressure gesture to move the microphone indicator, which also causes the microphone setting 1404 to be switched on. In some cases, any detectable pressure differential may be interpreted to switch the microphone indicator 1416. In other examples, the differential pressure gesture has to be made with the higher pressure input in the proper relative position to the lower pressure input to move the indicator into the on position. In yet other cases, the pressure differential gesture may be made in a first position of the input surface for changing the position of the microphone indicator and other differential pressure gestures made in a different region of the input surface may be for moving the indicator of another parameter. For example, when the conference call application is running on the laptop, a control panel may appear to the side with indicators for the camera and the microphone. Those differential pressure gestures made on the right side of the input surface may control the microphone setting 1404 while the differential pressure gestures made on the left side of the input surface may be for moving the camera setting indicator 1418.

In another example, the user may be prompted to set a parameter. In such a situation, an option may appear on the display with a parameter indicator. The user may be asked to set the parameter to the level that he or she desires. While the option is depicted in the display, the depicted parameter may become the default setting whose indicator is moved in response to a differential pressure input.

In some cases, the indicator is a dial 1420 with a level arranged around the circumference of the dial 1420. The dial 1420 may be rotated based on the relative position of the differential pressure input. In other examples, the indicator may be a numeral value 1422 where the value can be moved up or down to adjust the parameter as desired by the user based on the user's differential pressure inputs. In yet another example, the indicator may be a slider indicator 1424, where a slider may be moved along a continuum to adjust the value of the setting parameter.

Figure 15:
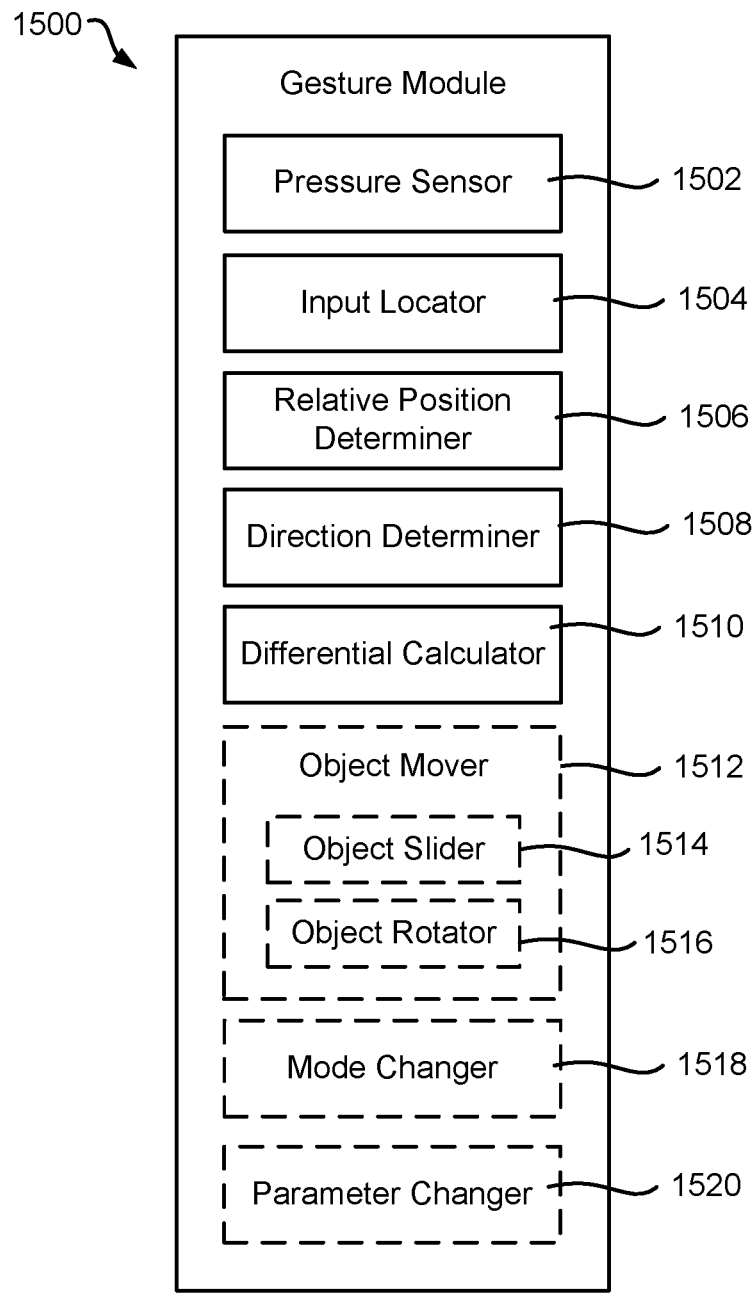
FIG. 15 depicts an example of a gesture module in accordance with the disclosure.

FIG. 15 depicts an example of a gesture module 1500. In this example, the gesture module 1500 includes programmed instructions in memory and may include associated firmware, logic, processing resources, memory resources, power sources, hardware, or other types of hardware to carry out the tasks of the gesture module 1500. The gesture module 1500 may be used in conjunction with the description of the devices, modules, and principles described in relation to FIGS. 1-14 and 16-21. In this example, the gesture module 1500 includes a pressure sensor 1502, an input locator 1504, a relative position determiner 1506, a direction determiner 1508, and a differential calculator 1510. In some cases, the object mover 1512 optionally includes an object mover 1512. In some cases, the object mover 1512 optionally includes an object slider 1514. In some cases, the object mover 1512 optionally includes an object rotator 1516. In some cases, the gesture module 1500 optionally includes a mode changer 1518. In some cases, the gesture module 1500 optionally includes a parameter changer 1520.

The pressure sensor 1502 may sense a pressure that is applied to the input surface. In some cases, a single pressure sensor 1502 may be used to sense multiple pressures applied to the input surface. In other examples, multiple pressure sensors 1502 may be positioned to sense the pressure loads applied to the input surface. In some cases, the pressure sensor 1502 may also determine the value of the pressure applied to the input surface.

The input locator 1504 may determine the location on the input surface where the pressure input is applied. The input locator may analyze the value of the pressure measured with the pressure sensor. In examples with multiple pressure sensors, the input locator may analyze the differences in values of the pressures measured at each pressure sensor. In some examples where a capacitance sensor is incorporated into the stack as the pressure sensors, the measurements made with the capacitance sensor may also be used to determine where the pressure inputs are made. In other examples, other types of sensors may be used to at least assist in determining the location of the pressure inputs. For example, a non-exhaustive list of sensors that could be used to at least assist in determining the location of the pressure inputs may include, but is not limited to, video sensors, inductive sensors, pressure sensors, capacitance sensors, audio sensors, accelerometers, level sensors, resistivity sensors, magnetic sensors, other types of sensors, or combinations thereof.

The relative position determiner 1506 determines the relative position between a higher pressure input and a lower pressure input. The relative position determiner may determine an angle made between the higher pressure input and the lower pressure input. In some cases, this angle may be determined with respect to a reference point, such as an edge of the input surface or another reference point.

The direction determiner 1508 may determine the direction that the object is to be moved in the display. This direction may be based, at least in part, on the angle between the higher pressure input and the lower pressure input. The direction may also be based, at least in part, on the relative position between the higher pressure input and the lower pressure input. The system may include a programmed rule that indicates the direction is to mimic the direction from the lower pressure input to the higher pressure input or from the higher pressure input to the lower pressure input. Thus, if the angle between the inputs is 47.9 degrees and the lower pressure input on the input surface is located in a bottom right side of the input surface and the higher input surface is located more towards the top left hand portion of the input surface, the object in the display may move towards the top left hand side of the display at a 47.9-degree direction.

The differential calculator 1510 may determine the difference between the values of the pressures between the lower pressure input and the higher pressure input. This difference may be determined by subtracting the lower pressure input's value from the higher pressure input's value or vice versa.

The object mover 1512 may cause the object to move in the display. The object may be moved in a direction determined by the direction determiner 1508. In some cases, the object mover optionally includes an object slider 1514 that causes the object to slide across the display from a first two-dimensional coordinate location to a second two-dimensional coordinate location. In other examples, the object may be depicted in a three-dimensional display, such as in a virtual reality display, an augmented reality display, a 3D video display, a projected display, a holographic display, another type of display, or combinations thereof. In such an example with a three-dimensional display, the object slider may move the object from a first three-dimensional coordinate location to a second three-dimensional coordinate location.

In some cases, the object mover optionally includes an object mover 1512 that causes the object to rotate in the display from a first orientation to a second orientation. In other examples, the object may be depicted in a three-dimensional space, such as in a virtual reality space, an augmented reality space, a 3D video, a curved display, another type of space, or combinations thereof. In such an example with a three-dimensional space, the object slider may move the object from a first three-dimensional coordinate location to a second three-dimensional coordinate location.

A mode changer 1518 may change a mode of a parameter of a device in communication with the input device in response to the differential pressure input. In some cases, the mode may be change by moving an indicator that represents the current mode of the device. In other cases, the mode changer causes the mode to be changed even when the mode is not depicted in the display.

A parameter changer 1520 may change a mode of a parameter of a device in communication with the input device in response to the differential pressure input. In some cases, the parameter changer may move an indicator that represents the current level of the parameter. In other cases, the parameter changer causes the parameter to be changed even when the parameter's level or setting is not depicted in the display.

Figure 16:
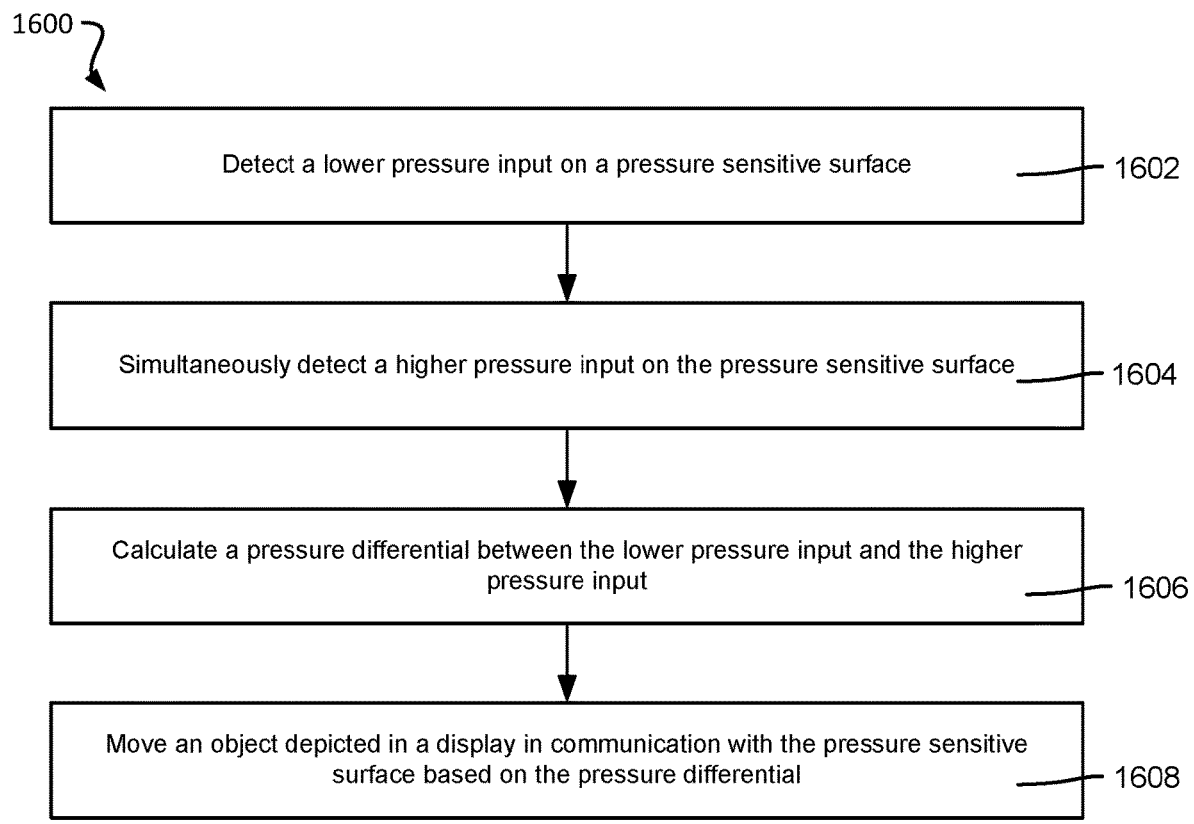
FIG. 16 depicts an example of a method of using a pressure gesture in accordance with the disclosure.

FIG. 16 depicts an example of a method 1600 of using a pressure gesture. This method 1600 may be performed based on the description of the devices, modules, and principles described in relation to FIGS. 1-15. In this example, the method 1600 includes detecting 1602 a lower pressure input on a pressure sensitive surface, simultaneously detecting 1604 a higher pressure input on the pressure sensitive surface, calculating 1606 a pressure differential between the lower pressure input and the higher pressure input, and moving 1608 an object depicted in a display in communication with the pressure sensitive surface based on the pressure differential.

Figure 17:
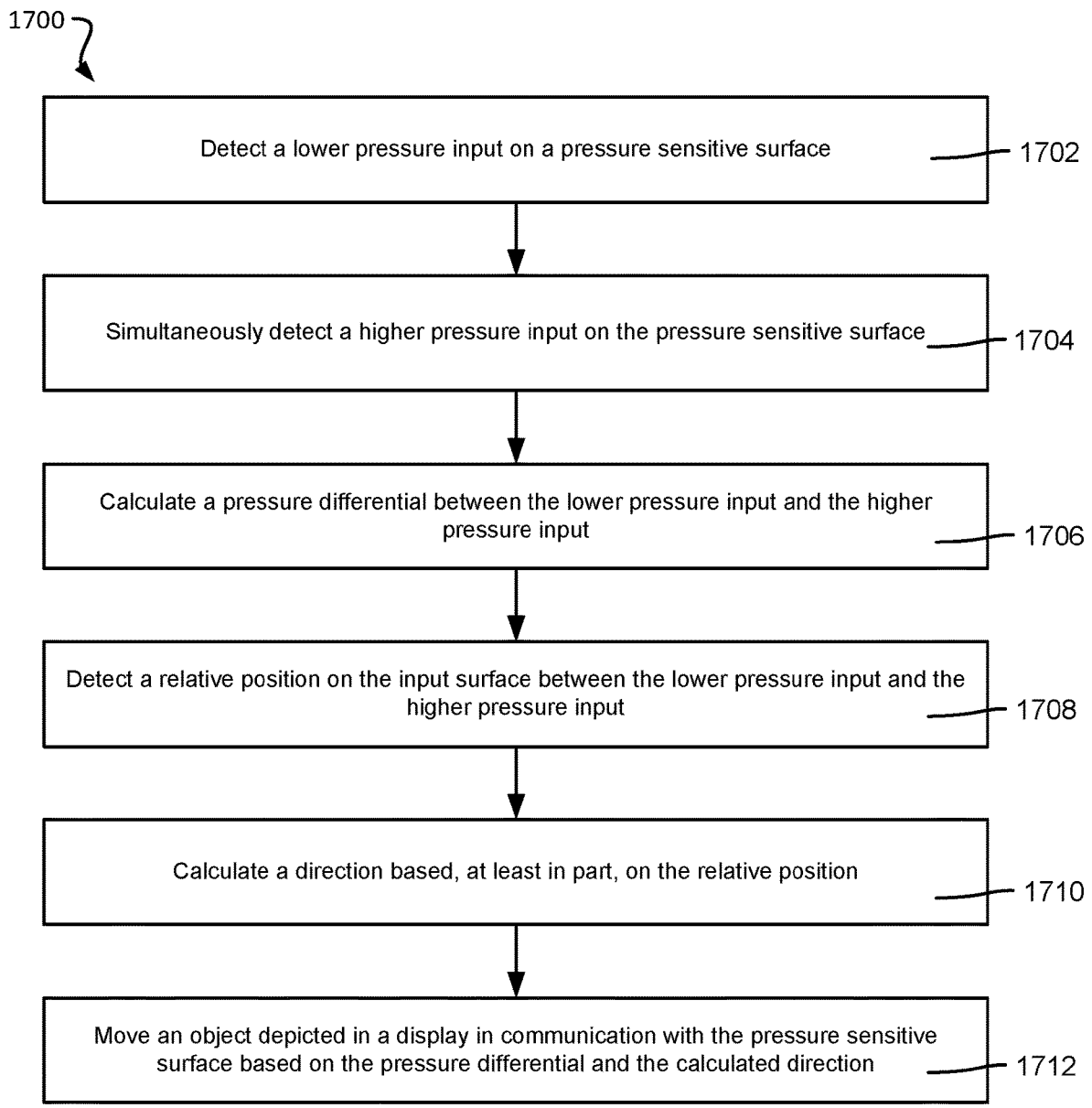
FIG. 17 depicts an example of a method of using a pressure gesture in accordance with the disclosure.

FIG. 17 depicts an example of a method 1700 of using a pressure gesture. This method 1700 may be performed based on the description of the devices, modules, and principles described in relation to FIGS. 1-15. In this example, the method 1700 includes detecting 1702 a lower pressure input on a pressure sensitive surface, simultaneously detecting 1704 a higher pressure input on the pressure sensitive surface, calculating 1706 a pressure differential between the lower pressure input and the higher pressure input, detecting 1708 a relative position on the input surface between the lower pressure input and the higher pressure input, calculating 1710 a direction based, at least in part, on the relative position, and moving 1712 an object depicted in a display in communication with the pressure sensitive surface based on the pressure differential and the calculated direction.

Figure 18:
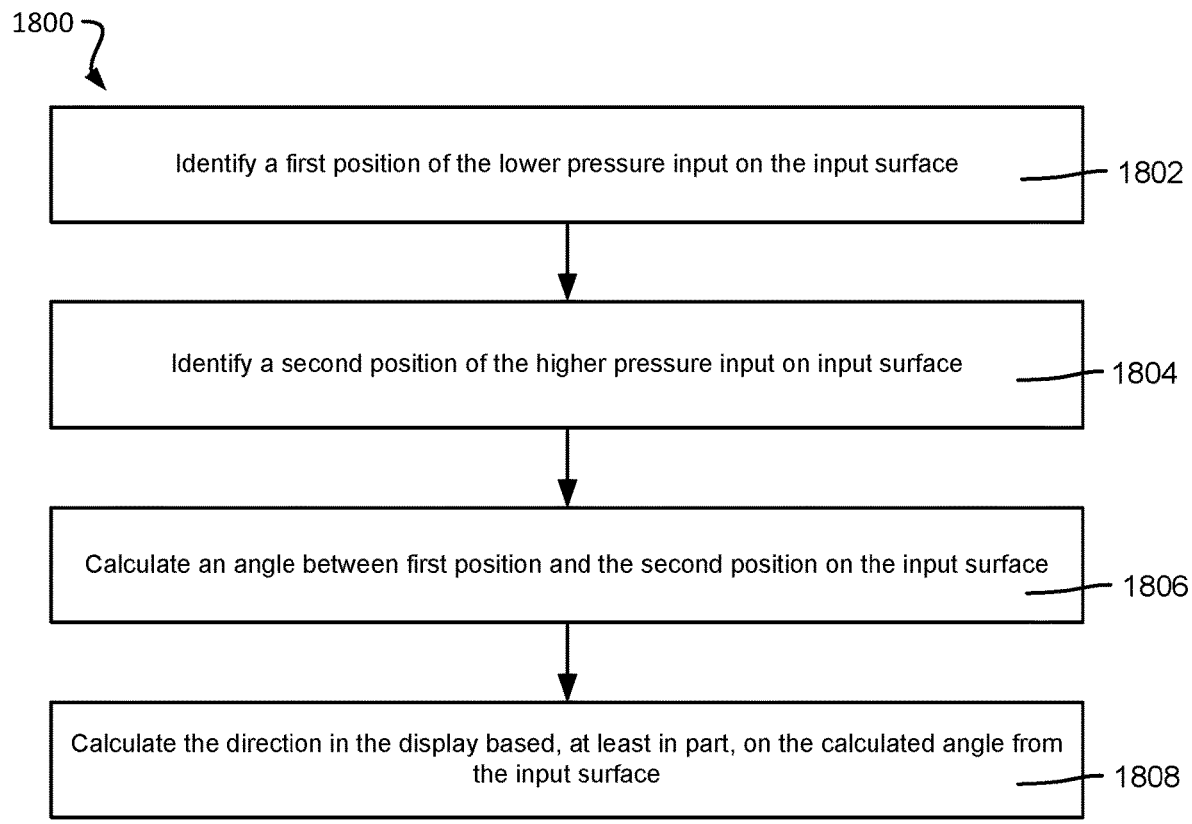
FIG. 18 depicts an example of a method of using a pressure gesture in accordance with the disclosure.

FIG. 18 depicts an example of a method 1800 of using a pressure gesture. This method 1800 may be performed based on the description of the devices, modules, and principles described in relation to FIGS. 1-15. In this example, the method 1800 includes identifying 1802 a first position of the lower pressure input on the input surface, identifying 1804 a second position of the higher pressure input on input surface, calculating 1806 an angle between first position and the second position on the input surface, and calculating 1808 the direction in the display based, at least in part, on the calculated angle from the input surface.

Figure 19:
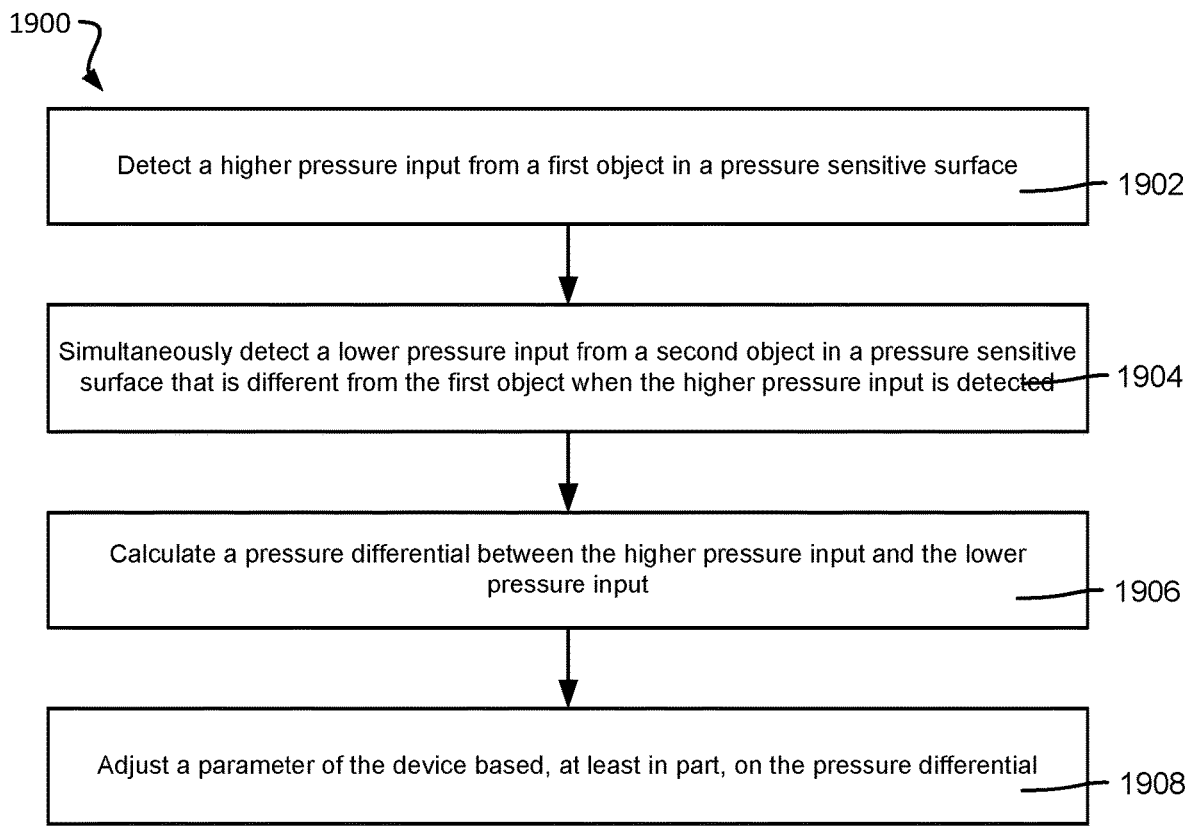
FIG. 19 depicts an example of a method of using a pressure gesture in accordance with the disclosure.

FIG. 19 depicts an example of a method 1900 of using a pressure gesture. This method 1900 may be performed based on the description of the devices, modules, and principles described in relation to FIGS. 1-15. In this example, the method 1900 includes detecting 1902 a higher pressure input from a first object in a pressure sensitive surface; simultaneously detecting 1904 a lower pressure input from a second object in a pressure sensitive surface that is different from the first object when the higher pressure input is detected; calculating 1906 a pressure differential between the higher pressure input and the lower pressure input; and adjusting 1908 a parameter of the device based, at least in part, on the pressure differential.

Figure 20:
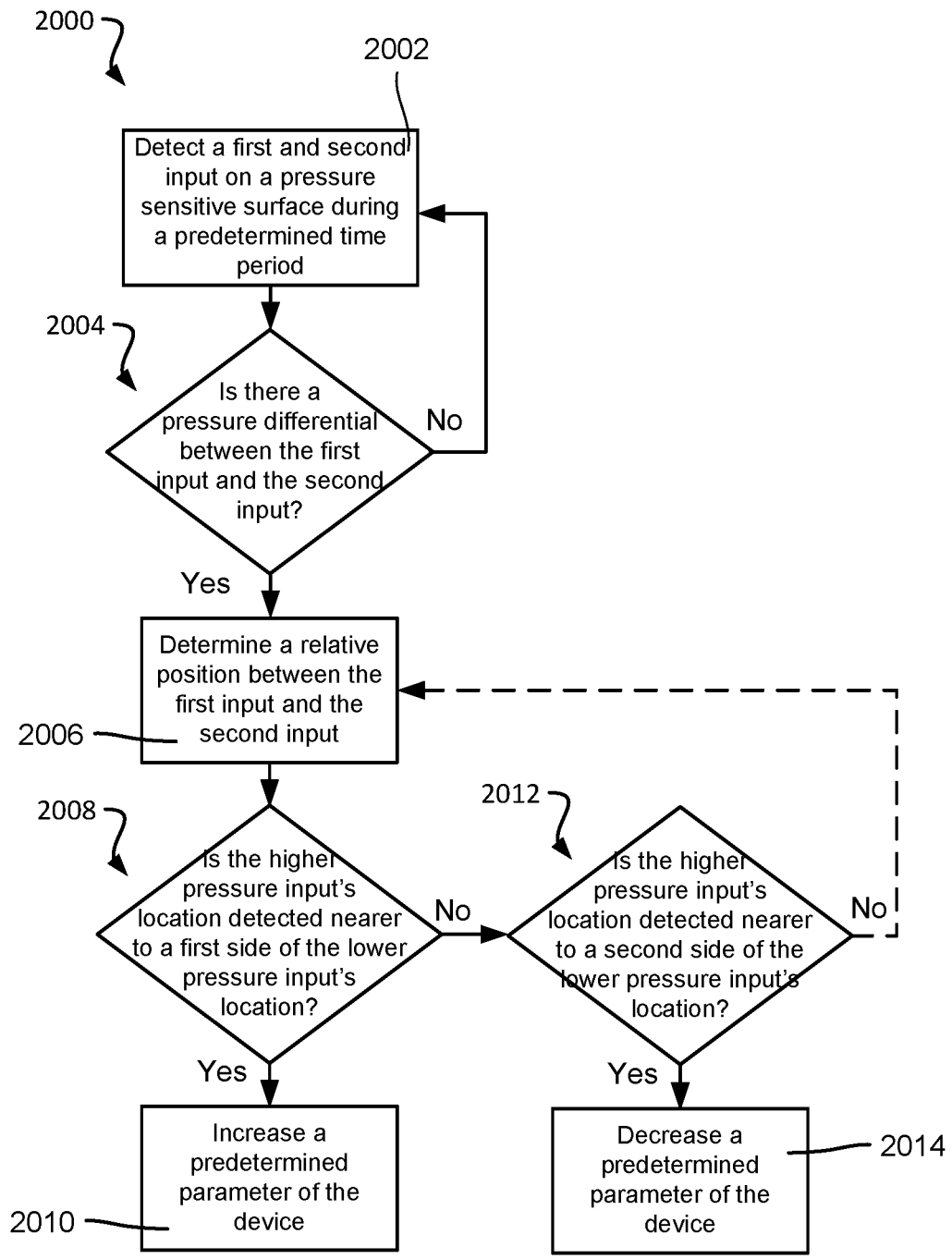
FIG. 20 depicts an example of a method of using a pressure gesture in accordance with the disclosure.

FIG. 20 depicts an example of a method 2000 of using a pressure gesture. This method 2000 may be performed based on the description of the devices, modules, and principles described in relation to FIGS. 1-15. In this example, the method 2000 includes detecting 2002 a first and second input on a pressure sensitive surface during a predetermined time period, and determining 2004 if there is a pressure differential between the first input and the second input. If there is no pressure differential, then the method 2000 goes back to monitoring for pressure inputs. If there is a pressure differential, then the method 2000 includes determining 2006 a relative position between the first input and the second input, and determining 2008 if the higher pressure input's location is detected nearer to a first side of the lower pressure input's location. If the higher pressure input's location is detected nearer to a first side of the lower pressure input's location, then the method 2000 includes increasing 2010 a predetermined parameter of the device. If the higher pressure input's location is not detected nearer to a first side of the lower pressure input's location, then the method 2000 includes determining 2012 if the higher pressure input's location is detected nearer to a second side of the lower pressure input's location. If the higher pressure input's location is detected nearer to a second side of the lower pressure input's location, then the method includes decreasing 2014 a predetermined parameter of the device. If not, the method may optional re-determine the relative positions. In other examples, the if the relative position of the higher pressure input and the lower pressure input is not conclusive, then the system may be programmed to execute a different action.

Figure 21:
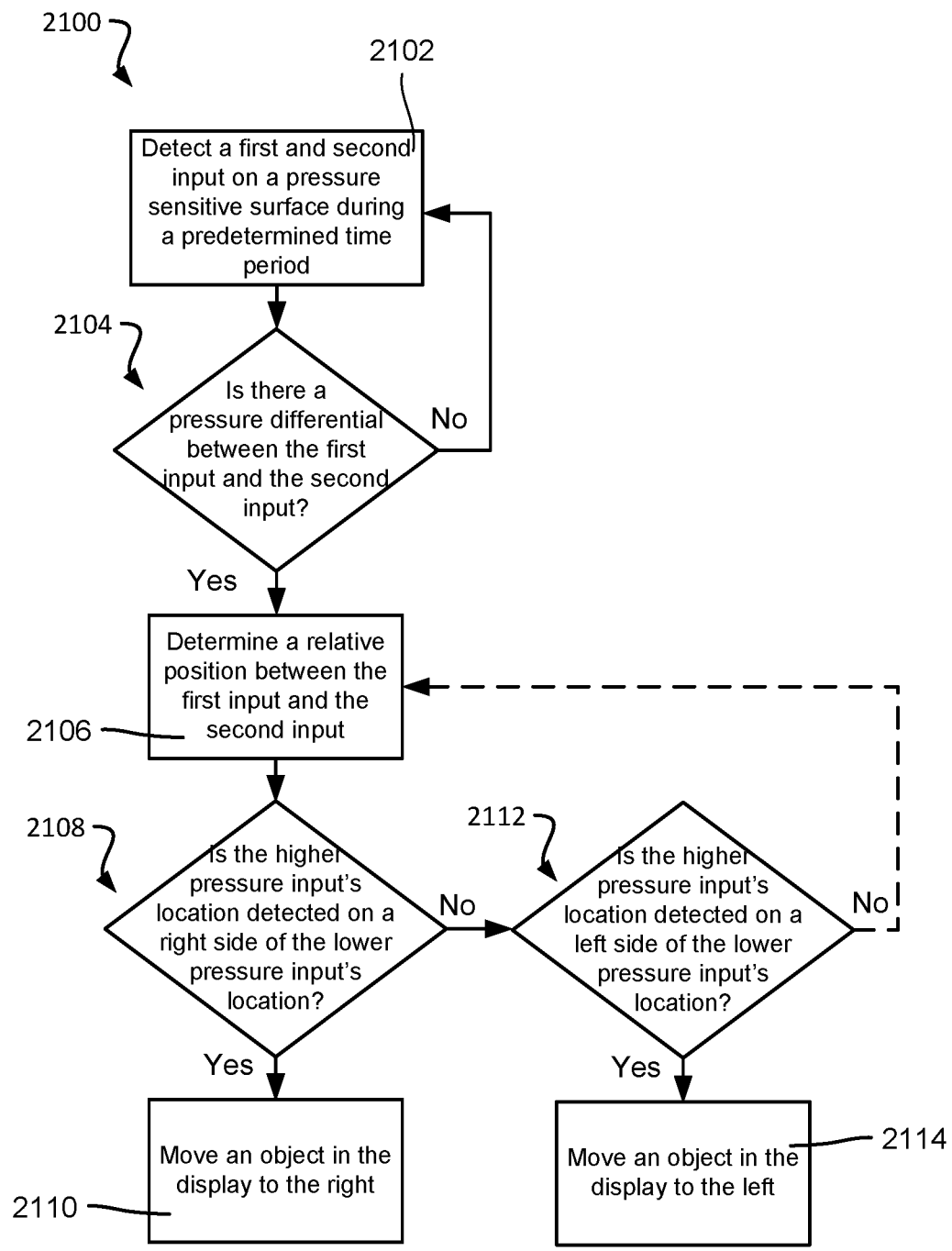
FIG. 21 depicts an example of a method of using a pressure gesture in accordance with the disclosure.

FIG. 21 depicts an example of a method 2100 of using a pressure gesture. This method 2100 may be performed based on the description of the devices, modules, and principles described in relation to FIGS. 1-15. In this example, the method 2100 includes detecting 2102 a first and second input on a pressure sensitive surface during a predetermined time period, and determining 2104 if there is a pressure differential between the first input and the second input. If there is no pressure differential, then the method 2100 goes back to monitoring for pressure inputs. If there is a pressure differential, then the method 2100 includes determining 2106 a relative position between the first input and the second input, and determining 2108 if the higher pressure input's location is detected on a right side of the lower pressure input's location. If the higher pressure input's location is detected on a right side of the lower pressure input's location, then the method 2100 includes moving 2110 an object in the display to the right. If the higher pressure input's location is not detected on a right side of the lower pressure input's location, then the method 2100 includes determining 2112 if the higher pressure input's location is detected on the left side of the lower pressure input's location. If the higher pressure input's location is detected one the left side of the lower pressure input's location, then the method 2100 includes moving 2114 the object in the display to the left.

If the higher pressure input is not determined to be on the right side or the left side, the method 2100 may optional re-determine the relative positions of the higher and lower pressure inputs. In other examples, the if the relative position of the higher pressure input and the lower pressure input is not conclusive, then the system may be programmed to execute a different action. In some cases, the system may determine that the higher pressure input is located adjacent a top side of the lower pressure input. In such an example, the system may cause the object in the display to move in a top side direction. In some cases, the system may determine that the higher pressure input is located adjacent a bottom side of the lower pressure input. In such an example, the system may cause the object in the display to move in a bottom side direction.

In some examples, the system is configured to move the object in the display in just two directions, such as to the right or to the left. In other examples, the system may be configured to move the object in additional directions such as in a top direction, a bottom direction, or another direction. In other cases, the system may be configured to move the object in any number of directions. In such an example, the system may determine an angle that is formed between the lower pressure input and the higher pressure input with respect to a reference point. The angle determined between these inputs on the input surface may correlate to an angle on the display, and the object in the display may be moved in that direction.

For example, the reference for determining the angle may be a flat edge of the touch input that is closest to the user when the user is operating the device or another edge of the input surface. Continuing with this example, if the lower pressure input is located in the center of the input surface, and the higher pressure input forms a line that forms a 36.3-degree angle with the bottom edge reference, then the relative position angle may be determined to be 36.3 degrees. The direction of the angle may be from the lower pressure input to the higher pressure input. This same angle and direction may be applied to the object in the display. For example, the object may be moved in a direction away from the center of the display at a positive 36.3-degree angle.

In some examples, the relative distance between the lower pressure input and the higher pressure input may be factored into determining how far to move the object in the screen. As an example, if the relative distance between the two objects is two inches, then the object in the display screen may be moved two inches. In this example, the ratio of relative distance on the input device to the object movement in the display is 1:1. However, this ratio may be any appropriate ratio. For example, the ratio maybe 5:1, 2:1, 1.1:1, 1:1, 1:1.1, 1:2, 1:5, another ratio, or combinations thereof. In other examples, the relative distance between the higher pressure input and the lower pressure input is not used as factor for considering how far to move the object.

In some examples, the object may move in the direction as long as the lower pressure input and the higher pressure input are being provided at the same time. In such an example, the object may move in the direction until the object reaches the limits of the display's screen, a boundary that limits the movement of the object, or combinations thereof if both the higher and lower pressure inputs are continuously inputted on to the input surface. In such an embodiment, when the higher pressure input, the lower pressure input, or both are no longer being inputted onto the input surface, then the object may stop moving.

In some cases, the speed of the object's movement may be determined, at least in part, on the value of the differential pressure between the higher pressure input and the lower pressure input. For example, if the pressure differential is large, then the object may move faster than if the pressure differential is small. In such an example, the speed of the object's movement may be proportional, directly proportional, indirectly proportional, and/or related to the differential pressure.

While the examples above have been described in regards to pressure differential gestures involving two inputs, these principles may be applied to three or more pressure inputs. In such cases, each of the different pressure inputs may measure at a different pressure value. In other such examples, just one of the three or more pressure inputs may measure at a different pressure value.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A device, comprising:
   a pressure sensor;
   a user interface including an input surface opposite to an underside of the user interface, where the underside is positioned near the pressure sensor;
   a controller;
   memory in communication with the controller and comprising programmed instructions that, when executed, cause the controller to:
   detect a lower pressure input;
   simultaneously detect a higher pressure input;
   calculate a pressure differential between the lower pressure input and the higher pressure input;
   detect a relative position on the input surface between the lower pressure input and the higher pressure input;
   calculate a direction based, at least in part, on the relative position; and
   cause the object depicted in the display to move in the calculated direction in the display based on the pressure differential.

2. The device of claim 1, wherein moving the object depicted in the display includes moving a cursor depicted in the display.

3. The device of claim 1, wherein moving the object depicted in the display includes moving an indicator of a virtual control panel.

4. The device of claim 1, wherein moving the object depicted in the display includes moving a virtual three-dimensional object depicted in the display.

5. The device of claim 1, wherein moving the object depicted in the display includes moving the object from a first two-dimensional coordinate in the display to a second two-dimensional coordinate in the display.

6. The device of claim 1, wherein moving the object depicted in a display includes rotating the object from a first angular orientation in the display to a second angular orientation in the display.

7. The device of claim 1, wherein causing the object to move in the calculated direction includes rotating the object in the calculated direction.

8. The device of claim 1, wherein causing the object to move in the calculated direction includes moving the object from a first two-dimensional coordinate in the display to a second two-dimensional coordinate in the display.

9. The device of claim 1, wherein calculating the direction includes:
   identifying a first position of the lower pressure input on the input surface;

identifying a second position of the higher pressure input on input surface;

calculating an angle between the first position and the second position on the input surface; and calculating the direction in the display based, at least in part, on the calculated angle from the input surface.

10. The device of claim 1, wherein at least one of the lower pressure input and the higher pressure input is relatively static on the input surface with respect to the pressure sensor.

11. The device of claim 1, wherein moving the object depicted in a display includes moving the object at a speed that correlates with the magnitude of the pressure differential.

12. The device of claim 1, further comprising:

a capacitance sensor positioned near the underside of the input surface;

wherein the pressure sensor is capable of detecting changes to pressure and the capacitance sensor is capable of detecting changes to a proximity of an external object adjacent the input surface based, at least in part, on changes to capacitance.

13. A method of using a pressure gesture, comprising:

detecting a lower pressure input on a pressure sensitive surface;

simultaneously detecting a higher pressure input on the pressure sensitive surface;

calculating a pressure differential between the lower pressure input and the higher pressure input;

detect a relative position on the input surface between the lower pressure input and the higher pressure input;

calculate a direction based, at least in part, on the relative position; and move an object depicted in a display in communication with the pressure sensitive surface based on the pressure differential and the calculated direction.

14. The method of claim 13, wherein moving the object depicted in a display includes moving a cursor depicted in the display.

15. The method of claim 13, wherein moving the object depicted in a display includes moving an indicator of a virtual control panel.

16. The method of claim 13, wherein moving the object depicted in a display includes moving a virtual three-dimensional object depicted in the display.

17. The method of claim 13, wherein moving the object depicted in a display includes moving the object from a first two-dimensional coordinate in the display to a second two-dimensional coordinate in the display.

18. The method of claim 13, wherein moving the object depicted in a display includes rotating the object from a first angular orientation in the display to a second angular orientation in the display.

19. A computer-program product for using a pressure gesture, the computer-program product comprising a non-transitory computer-readable medium storing instructions executable by a processor to:

detect a lower pressure input on a pressure sensitive surface;

simultaneously detect a higher pressure input on the pressure sensitive surface;

calculate a pressure differential between the lower pressure input and the higher pressure input;

detect a relative position on the input surface between the lower pressure input and the higher pressure input;

calculate a direction based, at least in part, on the relative position; and move an object depicted in a display in communication with the pressure sensitive surface based on the pressure differential and the calculated direction.

* * * * *